L. W. BUGBEE.
TRIFOCAL LENS AND PROCESS OF MAKING THE SAME.
APPLICATION FILED OCT 24, 1921.

1,427,192.
Patented Aug. 29, 1922.

INVENTOR.
LUCIAN W. BUGBEE.
BY
ATTORNEYS.

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

TRIFOCAL LENS AND PROCESS OF MAKING THE SAME.

1,427,192.  Specification of Letters Patent. Patented Aug. 29, 1922.

Application filed October 24, 1921. Serial No. 509,969.

*To all whom it may concern:*

Be it known that I, LUCIAN W. BUGBEE, a citizen of the United States, and a resident of Indianapolis, county of Marion, and State or Indiana, have invented a certain new and useful Trifocal Lens and Process of Making the Same; and I do hereby declare that the following is a full, clear, and exact description thereof, reference being had to the accompanying drawings, in which like numerals refer to like parts.

This invention is a trifocal lens formed of one piece of glass of one refractive index, preferably by grinding the same, and having on one side thereof a lower reading portion, an upper distance portion and an intermediate portion for near distance, the reading portion having a downward or arched line of joinder with an intermedate portion, and the upper or distance portion having an up-curved or inverted arch line of joinder with the intermediate portion.

This sort of trifocal lens has virtues for certain people and certain uses, particularly in connection with certain trades or lines of work or activity where it is necessary or desirable to have a portion of the lens which focuses at a near distance or a few feet away.

Figure 1:
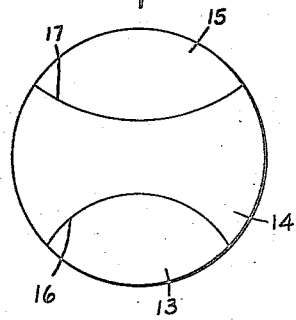
Figure 2:
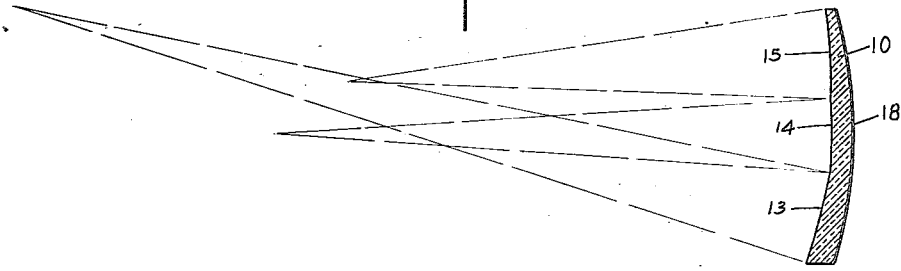
Figure 3:
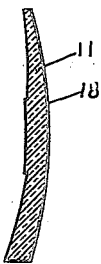
Figure 4:
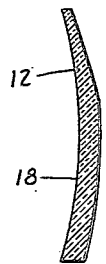
Figure 5:
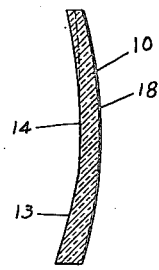

The full nature of this invention will be understood from the accompanying drawings and the following description and claims:

In the drawings, Figure 1 is a plan view of said lens showing the trifocal side. Fig. 2 is a central vertical section of such a trifocal lens as is shown in Fig. 1, with the trifocal visual surfaces on the concave side thereof and merging smoothly into each other at their lines of joinder. Fig. 3 is a similar section of such a lens having the three visual surfaces on the concave side thereof, but with a distinct shoulder between said surfaces. Fig. 4 is a similar section through such a lens with the trifocal visual surfaces on the convex side thereof and substantially merging smoothly at their lines of joinder. Fig. 5 is the same as Fig. 2 with the intermediate surface extended to the top of the lens and the upper or distance surface being indicated by a dotted line.

There is shown in Figs. 2, 3 and 4, three types of said trifocal lens, namely, lenses 10, 11 and 12. Each of these lenses has on one side three visual surfaces, a reading portion 13, an intermediate near-distance portion 14 and a distance portion 15. The line of division 16 between the reading portion and the intermediate portion is what is known as a downwardly curved or arched line of joinder, while the line of joinder 17 between the distance portion and the intermediate portion is what is known as the up-curve or inverted-arch line of joinder. The vertical widths of these three visual surfaces at the center are preferably about equal, but that may be modified as desired, the invention not being limited in respect to that feature. In Fig. 2 the radius of the near or reading portion is longer than the reading or the intermediate, and the latter is longer than the radius of the distance portion. Therefore, the prescription side 18 of the lens is finished, the reading portion 13 is of stronger focal power than the intermediate portion and the intermediate portion is of stronger power than the distance portion 15. Thus in the lens shown in Fig. 2, the concave surface of the reading portion is indicated as four dioptrics, the intermediate portion six dioptrics and the distance portion seven dioptrics. In the convex lens, shown in Fig. 4, the convex surface of the reading portion is seven dioptrics, the intermediate portion six dioptrics and the distance portion four dioptrics.

The preferable form is that shown in Fig. 2, wherein the three visual surfaces are on the concave side and merge smoothly into each other at their lines of joinder. In the form shown in Fig. 3, the lens is shouldered or depressed at the lines of joinder, the shoulders or depressions being preferably at substantially right angles to the adjacent surfaces so as not to interfere with the passage of the rays of light. The convex lens, shown in Fig. 4, has smoothly merging surfaces, but it may be also made with the shouldered lines of joinder.

This trifocal lens is of permanent form because it is made out of one integral and homogeneous piece of glass and, therefore, the portions thereof will not separate and the lines of joinder are approximately invisible, if made properly and carefully. Said lens also can be relatively cheaply and accurately made so that the manufacture thereof will be practical and successful and bring the lens, so far as price is concerned, within the range of prices which the public can afford and yet the lens will be of one piece of glass and as nearly optically perfect as lenses can be made.

The trifocal visual surfaces may be ground or formed by rotary laps or tools and thus make their manufacture thereof practical. One and probably the preferable process of making said lens consists in grinding on one side of a single piece of glass of uniform index two surfaces, namely, the reading surface 13 having a curvature suitable to provide the desired focal power for reading, and the remainder of the side of the piece of glass having the curvature and focal power of the portion 14, substantially as shown in Fig. 5. These two surfaces may be ground simultaneously or successively, as desired, and when ground simultaneously that may be done by the use of a single lap or tool having two grinding surfaces thereon corresponding to the surfaces to be generated, or by a plurality of laps or tools simultaneously used, so as to make the lines of joinder of the two visual surfaces merge smoothly or form a shoulder, and the grinding of said two surfaces may be done concentrically. In Fig. 5, said concave reading surface is four dioptrics and the remaining portion of the surface of that side of the lens is six dioptrics.

After the lens has been ground to provide the two surfaces just described and shown by full lines in Fig. 5, the distance or upper surface 15 may be generated. This is done by grinding away the upper portion (shown by the dotted lines in Fig. 5) of the upper surface shown by a full line in Fig. 5. That latter surface in the first step of the operation had been given a curvature of six dioptrics. By grinding away the upper portion, such upper portion of the lens would be weakened so as to afford distance vision. In Fig. 2, such upper portion is ground away sufficiently to give the distance portion of the lens a curvature of seven dioptrics. This upper surface is ground away preferable by a rotary lap or tool and while grinding said surface the remaining surfaces on the trifocal side are preferably coated with shellac or other protective means so that said surfaces will not be affected by the means employed for generating said upper visual surface 15.

While the lens herein has been described and referred to as having the stronger or reading portion below and the weaker or distance portion above, the invention is not limited to such arrangement as it may be desirable to invert the lens in mounting it in frames for certain uses in the trades or various occupations. Thus in certain occupations it is desirable that the near or reading portion be uppermost and the distance portion at the bottom. This, however, would not be the usual position of the lens in the frame.

Nor is this invention limited to any particular process for making such lens. However, that which has been described is considered to be the preferable process.

The invention claimed is:

1. A trifocal lens formed of a single piece of glass having a near vision portion, a distance portion, and a near-distance portion intermediate said near vision and distance portions, with the lines of joinder of said portions being curved in directions opposite to each other, substantially as set forth.

2. A trifocal lens formed of a single piece of glass having an intermediate portion, a lower portion which is stronger than the intermediate portion, an upper portion which is weaker than the intermediate portion, for near distance vision, the line of joinder between the strong and intermediate portions being arched or downwardly curved and the line of division between the weak and intermediate portions being up-curved, substantially as shown.

3. A trifocal lens formed of a single piece of glass having a near vision portion; a distance portion and a near distance portion intermediate said near vision and distance portions with the lines of joinder of said portions curved in directions opposite each other and said portions merging smoothly into each other at their lines of joinder, substantially as set forth.

4. A trifocal lens formed of a single piece of glass having three visual surfaces of different foci, one above the other, the upper surface having the longest focus and the lower surface the shortest focus and the intermediate surface a focal length greater than the lower surface and less than the upper surface, and the line of joinder separating the intermediate and lower surfaces being arched or downcurved and the line of joinder between the intermediate and upper surfaces being up-curved, subtsantially as shown.

5. The process of making a trifocal lens of one piece of glass in which the three portions of the lens are of different powers, which process includes generating the weaker portion of the lens after the other two portions of the lens have been generated.

6. The process of making a trifocal lens formed of a single piece of glass having an intermediate portion, a stronger portion on one side of said intermediate portion and a weaker portion on the other side of said intermediate portion, which process includes generating the stronger and intermediate portions of the lens first and so that the lens will have a curvature of the intermediate portion of the lens throughout its area excepting in the stronger portion of the lens, and thereafter generating the weaker portion of the lens on a part of the intermediate portion of the lens.

7. The process of making a trifocal lens formed of a single piece of glass having an intermediate portion, a stronger portion on one side of said intermediate portion and a weaker portion on the other side of said intermediate portion, which process includes simultaneously generating the stronger and intermediate portions of the lens first and so that the lens will have the curvature of the intermediate portion of the lens throughout its area excepting the stronger portion of the lens, and thereafter generating the weaker portion of the lens on a part of the stronger portion of the lens opposite the weaker portion of the lens.

8. The process of making a trifocal lens formed of a single piece of glass having an intermediate portion, a lower portion stronger than the intermediate portion, and an upper portion weaker than the intermediate portion with oppositely curved lines of joinder between said portions of the lens, which process includes generating the lower and intermediate portions of the lens and so that the curvature of the intermediate portion would extend throughout the surface of the lens, excepting the stronger portion of the lens and thereafter generating the upper portion of the lens on the upper part of said intermediate portion.

9. The process of making a trifocal lens formed of a single piece of glass having an intermediate portion, a lower portion stronger than the intermediate portion, and an upper portion weaker than the intermediate portion with oppositely curved lines of joinder between said portions of the lens, which process includes the simultaneous generating of the lower and intermediate portions of the lens and so that the curvature of the intermediate portion would extend throughout the surface of the lens excepting the stronger portion of the lens, and thereafter generating the upper portion of the lens on the upper part of said intermediate portion.

10. The process of making a trifocal lens formed of a single piece of glass having an intermediate portion, a lower portion stronger than the intermediate portion, and an upper portion weaker than the intermediate portion with oppositely curved lines of joinder between said portions of the lens, which process includes concentrically grinding the lower and intermediate portions of the lens and thereafter eccentrically grinding the upper portion of the lens on the upper part of said intermediate portion of the lens.

In witness whereof I have hereunto affixed my signature.

LUCIAN W. BUGBEE.